(12) United States Patent
Rummel et al.

(10) Patent No.: US 9,735,727 B2
(45) Date of Patent: Aug. 15, 2017

(54) CONTROLLER OF AN ELECTRIC MOTOR

(71) Applicant: Robert Bosch GmbH, Stuttgart (DE)

(72) Inventors: Michael Rummel, Achern-Oensbach (DE); Marcellus Weber, Ottersweier (DE); Michael Forscht, Appenweier (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/897,996

(22) PCT Filed: May 7, 2014

(86) PCT No.: PCT/EP2014/059357
§ 371 (c)(1),
(2) Date: Dec. 11, 2015

(87) PCT Pub. No.: WO2014/198461
PCT Pub. Date: Dec. 18, 2014

(65) Prior Publication Data
US 2016/0142002 A1  May 19, 2016

(30) Foreign Application Priority Data
Jun. 13, 2013  (DE) .................. 10 2013 211 017

(51) Int. Cl.
H02K 17/32   (2006.01)
H02P 29/028  (2016.01)
H02P 29/02   (2016.01)
H02P 1/00    (2006.01)
H02P 7/29    (2016.01)
(Continued)

(52) U.S. Cl.
CPC ......... *H02P 29/028* (2013.01); *H02H 7/0838* (2013.01); *H02H 11/003* (2013.01); *H02P 1/00* (2013.01); *H02P 7/29* (2013.01); *H02P 29/02* (2013.01); *H02P 29/027* (2013.01); *H02P 29/032* (2016.02); *H02P 31/00* (2013.01)

(58) Field of Classification Search
CPC .. H02H 11/002; H02H 11/003; H02H 7/0833; H02H 3/10; H03K 17/02; H02P 29/02; H02P 29/027; H02P 29/032; H02P 7/29
See application file for complete search history.

(56) References Cited

U.S. PATENT DOCUMENTS

| 2008/0008459 A1* | 1/2008 | Haesters ............ G01R 19/0092 388/811 |
| 2011/0134576 A1 | 6/2011 | Clemente et al. |
| 2012/0075893 A1* | 3/2012 | Higuchi .................. H02M 1/32 363/37 |

FOREIGN PATENT DOCUMENTS

| DE | 101 39 093 | 3/2003 |
| DE | 1 349 255 | 10/2003 |
| DE | 11 2007 001292 | 10/2009 |

OTHER PUBLICATIONS

Marco Purschel Application Note 2.0, Jun. 2009, <<Automotive MOSFET Reverse Battery Protection >>, Jun. 2009.

* cited by examiner

*Primary Examiner* — Karen Masih
(74) *Attorney, Agent, or Firm* — Norton Rose Fulbright US LLP; Gerard Messina

(57) ABSTRACT

A controller for an electric motor includes a protective circuit for limiting current or for polarity reversal protection, the protective circuit including a field effect transistor having a gate. The protective circuit further includes a control unit for providing a control voltage for the gate, a smoothing capacitor for charge storage being provided at the gate.

9 Claims, 3 Drawing Sheets

(51) Int. Cl.
*H02P 29/024* (2016.01)
*H02H 7/08* (2006.01)
*H02H 11/00* (2006.01)
*H02P 29/032* (2016.01)
*H02P 31/00* (2006.01)

CONTROLLER OF AN ELECTRIC MOTOR

FIELD OF THE INVENTION

The present invention relates to a controller of an electric motor.

BACKGROUND INFORMATION

A wide variety of different electric motors is installed in a motor vehicle. Such an electric motor may drive, for example, a valve, a flap, a pump, a fan, a power window, a seat adjuster, a windshield wiper, or another element on board the motor vehicle. The electric motor is equipped with a controller in order, for example, to control a direction of rotation or a rotational speed as a function of existing requirements. The controller often includes a programmable microcomputer having a data interface for exchanging control data. The microcomputer then controls the electric motor with the aid of a power circuit.

In order to protect the controller, the electric motor, or an electrical supply network, on which the controller and the electric motor are operated, from damage, the controller may include one or multiple protective circuits, which limit or shut off a current when it is determined that a fault condition exists. For example, a current through the electric motor may be shut off if it was detected that the supply voltage of the controller or of the electric motor has the wrong polarity. In another specific embodiment, the protective circuit may be provided in order to limit a current through the electric motor, in particular during a start-up phase.

Such a protective circuit includes a field effect transistor having a gate. In order to switch on the field effect transistor, voltage at the gate must exceed a predefined plateau voltage. If at least the plateau voltage is present, a leakage current flows from the gate through the field effect transistor, so that a certain output is required in order to hold the gate above the plateau voltage.

SUMMARY OF THE INVENTION

An object of the present invention is to provide a controller, a method, and a computer program product in order to permit a more energy-efficient operation of the controller. The present invention achieves these objects with the aid of a controller, a method, and a computer program product having the features described herein. Further descriptions herein describe further specific embodiments.

A controller according to the present invention for an electric motor includes a protective circuit for limiting current or for polarity reversal protection, the protective circuit including a field effect transistor having a gate. The protective circuit also includes a control unit for providing a control voltage for the gate, a smoothing capacitor for charge storage being provided at the gate.

As a result, it is possible to periodically charge the smoothing capacitor in order to hold the control voltage at a value which permits a current flow through the field effect transistor. In contrast to the usual approach, in which a controlling device must continuously hold the control voltage above the predetermined voltage without the smoothing capacitor, an output required to allow a controlled current flow through the field effect transistor may be reduced by the periodic charging of the smoothing capacitor. As a result, the controller may take up less current. The conserved electrical energy may contribute to reduced fuel consumption and to reduced pollutant emission, in particular when the controller is used on board a motor vehicle. As compared to a known approach to achieve the object, the described controller requires only a few additional components and may be built easily, quickly, and compactly. The controller may be used in combination with a wide variety of electric motors, which are installed on board the motor vehicle. The total amount of electrical energy, which may be conserved as a result, may therefore add up to a significant amount.

In one specific embodiment, the control unit is configured to control the smoothing capacitor with the aid of pulse width modulation in order to hold a voltage at the gate above a predetermined value. A pulse-width modulated signal may, for example, be easily provided by a digital control circuit. A pulse width ratio and a modulation frequency may be controlled very precisely in such a way that the voltage at the gate may be close above the predetermined value in order to permit maximum savings of electrical energy.

In one specific embodiment, a forward diode is provided between the control unit and the gate in order to prevent a discharge of the smoothing capacitor during a time interval of the pulse width modulation. As a result, it may be ensured that electrical energy, which was accumulated in the smoothing capacitor during a first time interval, does not flow back to the control unit during a second time interval. The savings of electrical energy may be further increased as a result. In one specific embodiment, the forward diode may be included in the control unit.

In a first variant, the protective circuit includes a polarity reversal protection and the field effect transistor is inserted into a supply line to a supply voltage. The polarity reversal protection is usually required for controllers and electric motors on board a motor vehicle in order to avoid physical damage and personal injury by an inadvertently wrong polarity.

In another variant, which may be combined with the aforementioned variant, the protective circuit includes a switch-on current limitation, the field effect transistor being connected, in series with an intermediate circuit capacitor, to a supply network. A switch-on current of the electric motor may be a multiple of its continuous current. In order to reduce a load of a supply network, the intermediate circuit capacitor may be discharged into the electric motor during start-up. A high current may flow, however, if the controller is connected to the supply network and the intermediate circuit capacitor is charged. By providing the protective circuit for limiting the current flowing into the intermediate circuit capacitor, it is possible to prevent a shortening of the service life of a circuit element for connecting the device to the supply network.

In one specific embodiment, the electric motor is intended to run for only a fraction of the time during which the controller is supplied with a voltage. An electric motor of this type is also referred to as an electric motor that runs for a short time; its runtime is usually approximately 10% or less than the time during which the controller carries voltage. A wide variety of such electric motors that run for a short time, which are at a standstill most of the time that the motor vehicle is operating, may be used on board a motor vehicle. The controller is usually also supplied with a voltage during the down times. A standby current draw during a down time of the electric motor may be reduced by using the described controller. The entire motor vehicle may therefore be operated, in a known manner, with less electrical energy.

A method according to the present invention for controlling a protective function in the described controller includes steps of detecting that a fault condition is not present and of providing a pulse-width modulated voltage at the gate of the field effect transistor. A duty factor of the pulse-width modulated voltage is selected in such a way that the voltage at the gate is held above a predetermined value.

The generation of the pulse-width modulated voltage at the gate of the field effect transistor may be easily carried out, in particular, with the aid of a programmable microcomputer. A suitable peripheral device in the form of a programmable counter or timer may possibly already be included in the programmable microcomputer or the control unit and may be used for generating the pulse-width modulated voltage.

In one specific embodiment, the duty factor is selected as a function of a capacitance of the smoothing capacitor and of a leakage current of the field effect transistor. Therefore, a predetermined duty factor may be used in order to readily ensure that the voltage at the gate of the field effect transistor reliably exceeds the predetermined value. A further determination or control of the duty factor within the scope of the described method is then no longer required.

In a further specific embodiment, the pulse-width modulated voltage is reduced if a fault condition was detected. The duty factor or the frequency of the pulse-width modulated voltage may be adjusted, in an analogous manner or in a number of predetermined steps, in such a way that a reduced current may still flow through the field effect transistor. As an alternative, the voltage at the gate may also be switched off, so that the field effect transistor is blocking.

A computer program product according to the present invention includes a program code arrangement for carrying out the described method when the computer program product runs on a processing unit or is stored on a machine-readable data carrier.

The present invention will now be described in greater detail with reference to the attached figures.

DETAILED DESCRIPTION

Figure 1:
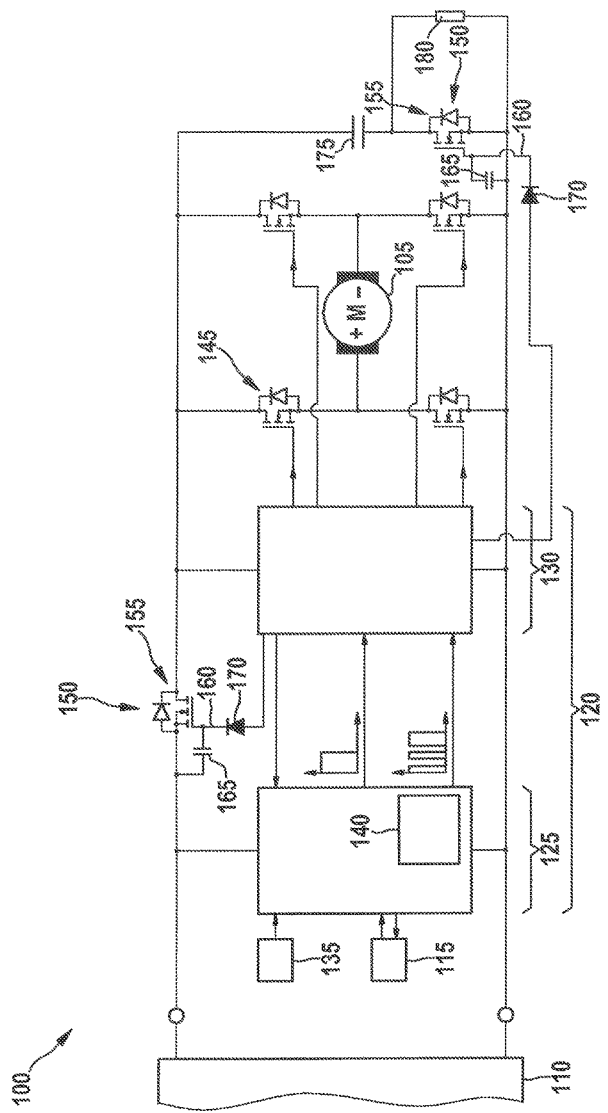
FIG. 1 shows a wiring diagram of a controller for an electric motor.

FIG. 1 shows a controller 100 for an electric motor 105. Controller 100 is configured for operating electric motor 105 on an electrical supply network 110 as a function of a control signal. An interface 115 may be provided for receiving the control signal and possibly for the return transmission of data.

Controller 100 includes a control unit 120, which, in the specific embodiment shown here, includes what may be a digital processing unit 125, in particular in the form of a programmable microcomputer, and a power circuit 130. Processing unit 125 may include, in addition to interface 115, a clock generator 135 for providing a constant clock signal, or a programmable counter or timer 140. In the exemplary specific embodiment shown, processing unit 125 transmits a direction signal and a pulse-width modulated speed signal to power circuit 130 in order to effectuate a desired direction of rotation and rotational speed of electric motor 105. In one specific embodiment, diagnostic information may be transmitted from power circuit 130 back to processing unit 125.

A bridge circuit 145, which is shown as a full bridge by way of example, connects electric motor 105, according to the inputs of power circuit 130, to a supply voltage, which is essentially drawn from supply network 110.

In addition, an optional first and an optional second protective circuit 150 are provided. Protective circuit 150 shown at the top in FIG. 1 includes a field effect transistor 155, which here is an n-channel MOSFET. Field effect transistor 155 is installed in the forward direction, i.e., current also flows when field effect transistor 155 is switched off; when field effect transistor 155 is switched on, its installed free-wheeling diode is bridged. First protective circuit 150 therefore implements polarity reversal protection. A smoothing capacitor 165 is provided between a gate 160 of field effect transistor 155 and a terminal of supply network 110. An optional forward diode 170 is provided between control device 120 and gate 160 of field effect transistor 155 of protective circuit 150. In one specific embodiment, forward diode 170 is included in control unit 120. Forward diode 170 is polarized, as a function of the design of field effect transistor 155, in such a way that it permits charging of smoothing capacitor 165 when a voltage of control unit 120 has a corresponding polarity, but prevents a discharge when the voltage of control unit 120 has the reversed polarity.

Control unit 120 is configured for controlling protective circuit 150 with the aid of a pulse-width modulated signal in such a way that a control voltage sets in at gate 160, the control voltage being above a predetermined value, a so-called plateau voltage, which is typically approximately 7 V.

Smoothing capacitor 165 is periodically charged by way of the pulse-width modulated signal and is permanently discharged by way of a leakage current of field effect transistor 155. The modulation frequency and the duty factor of the pulse-width modulated signal are selected in such a way that the charging pulses essentially equalize the discharge over time, so that the control voltage at gate 160 is high enough to allow current to flow through field effect transistor 155.

Protective circuit 150 shown on the right in FIG. 1 includes the same components as the other protective circuit 150 described above and implements a switch-on current limitation. The switch-on current limitation may be used to extend the service life of a relay in the vehicle, which supplies controller 100 with a voltage. Such a relay is used in a wide variety of vehicles under the designation KL15 relay. During every switch-on process of this relay, if a switch-on current limitation is not used, a high charging current flows into intermediate circuit capacitor 175, which greatly loads the relay.

If the relay is closed, so that controller 100 is supplied with a voltage, Mosfet 155 is blocked and intermediate circuit capacitor 175 is connected to the vehicle electrical system only via a current limiting resistor 180. Only a low charging current flows into intermediate circuit capacitor 175, so that this is slowly charged. After a predetermined charging time after the relay is closed, controller 100 activates the voltage at gate 160 of field effect transistor 155 shown on the right in FIG. 1. Intermediate circuit capacitor 175 is connected to the vehicle electrical system with low resistance for as long as the relay is closed, without a high charging current flowing. After intermediate circuit capacitor 175 is charged, electric motor 105 may be switched on.

Figure 2:
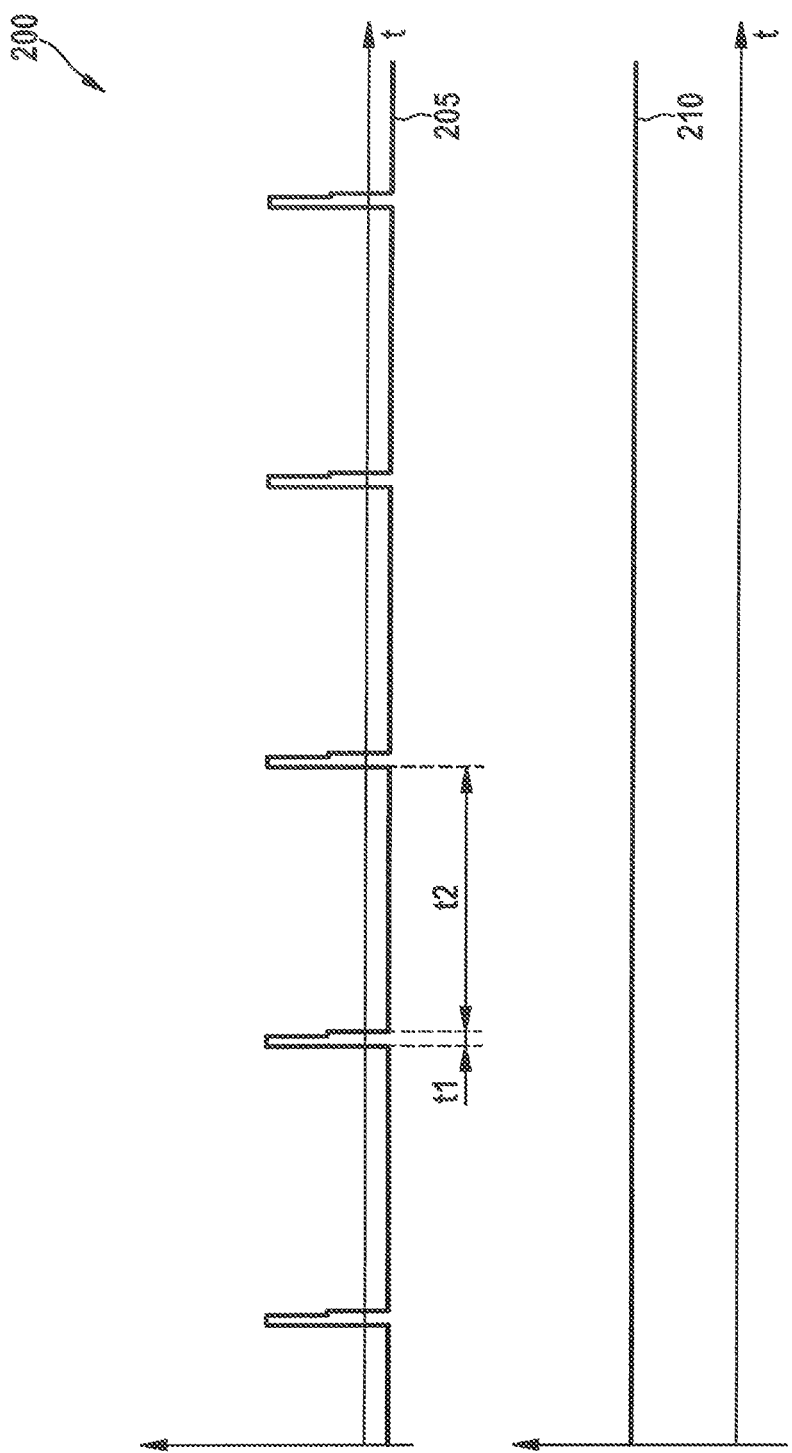
FIG. 2 shows curves over time of voltages at the controller from FIG. 1.

FIG. 2 shows curves over time 200 of voltages at controller 100 from FIG. 1. Voltages are plotted in the vertical direction and times are plotted in the horizontal direction. A first curve 205 shows a pulse-width modulated signal, which controller 120 outputs at one of the protective circuits 150, and a second curve 210 shows the control voltage, which sets in at gate 160 of the corresponding field effect transistor 155.

Using a commercially available field effect transistor 155 and a smoothing capacitor 165 having a capacitance of approximately 1 µF, second curve 210 may permanently be above a voltage of approximately 10 V if the first curve periodically delivers a positive voltage pulse of approximately 3 ms during a first time period T1 and subsequently remains at a low voltage level of approximately 100 ms during a second time period T2. The current uptake of an exemplary implementation of controller 100 from FIG. 1 is approximately 5.5 mA under these conditions. As compared to a specific embodiment in which a smoothing capacitor 165 is not used and field effect transistor 155 is controlled with a constant signal, this corresponds to energy savings of approximately 6.5 mA.

Figure 3:
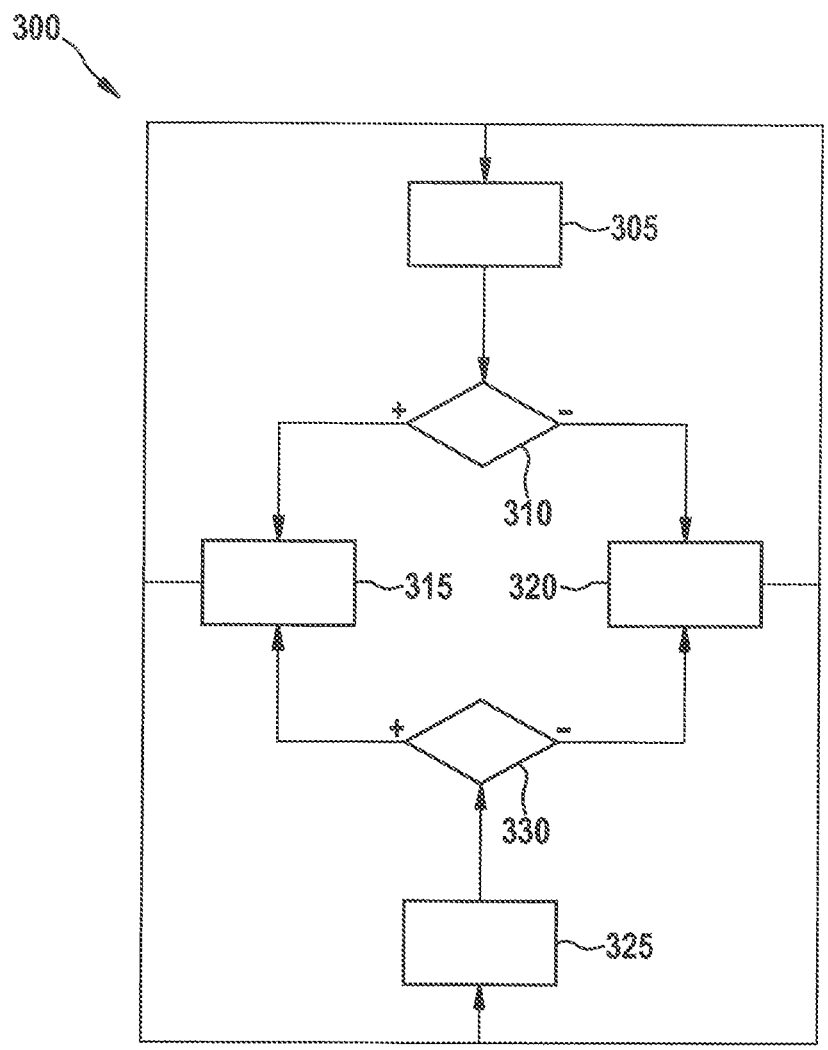
FIG. 3 shows a flow chart of a method for controlling a protective function in the controller from FIG. 1.

FIG. 3 shows a flow chart of a method 300 for controlling a protective function in controller 100 from FIG. 1. Method 300 is configured, in particular, to be run on control unit 120. A first part of method 300 begins in a step 305, in which a current flowing through electric motor 105 is sampled. In a subsequent step 310, a check is carried out as to whether the sampled current is greater than a predetermined threshold value. If this is the case, it is determined that a fault condition exists and, in a step 315, a pulse width ratio of a signal, which controls protective circuit 150 shown on the right in FIG. 1, is modified in such a way that only a reduced current or even no current at all may flow through field effect transistor 155. If it is determined in step 310, however, that the determined current is lower than the predetermined threshold value, the pulse width ratio is set, in a step 320, in such a way that the current may flow freely through field effect transistor 155. Subsequently, the method returns from one of the steps 315 or 320 to step 305.

A second part of method 300 begins in a step 325, in which it is determined whether the polarity with which controller 100 is connected to supply network 110 is reversed, i.e., whether reversed polarity exists. If this is the case, the method continues with step 315, otherwise with step 320, as described above. Method 300 then returns from step 315 or 320 to step 325.

The first part of method 300 relates to protective circuit 150 shown on the right in FIG. 1, and the second part relates to protective circuit 150 shown at the top. If only one of the protective circuits 150 is provided, then only the part assigned to this part of method 300 may be omitted. The two parts of the method may also be carried out concurrently or integrated with one another, it being possible to carry out steps 305 and 325 in a fixed sequence or independently of one another. In yet another specific embodiment, the two parts of method 300 run fully independently of one another.

What is claimed is:

1. A controller for an electric motor, comprising:
   a protective circuit for at least one of limiting current and protecting against a polarity reversal, wherein the protective circuit includes a field effect transistor having a gate;
   a control unit to output a control voltage for the gate, wherein there is a smoothing capacitor for charge storage at the gate,
   wherein the control unit is configured to control the smoothing capacitor with the aid of pulse width modulation to hold a voltage at the gate above a predetermined value.

2. The controller of claim 1, wherein there is a forward diode between the control unit and the gate to prevent a discharge of the smoothing capacitor during a time interval of the pulse width modulation.

3. The controller of claim 1, wherein the protective circuit includes polarity reversal protection and the field effect transistor is inserted into a supply line of the electric motor to a supply voltage.

4. A controller for an electric motor, comprising:
   a protective circuit for at least one of limiting current and protecting against a polarity reversal, wherein the protective circuit includes a field effect transistor having a gate;
   a control unit to output a control voltage for the gate, wherein there is a smoothing capacitor for charge storage at the gate,
   wherein the protective circuit includes a switch-on current limitation, and wherein the field effect transistor is connected, in series with an intermediate circuit capacitor, to a supply network.

5. A controller for an electric motor, comprising:
   a protective circuit for at least one of limiting current and protecting against a polarity reversal, wherein the protective circuit includes a field effect transistor having a gate;
   a control unit to output a control voltage for the gate, wherein there is a smoothing capacitor for charge storage at the gate,
   wherein the electric motor is intended to run for only a fraction of the time during which the controller is supplied with a voltage.

6. A method for controlling a protective function in a controller, the method comprising:
   detecting that a fault condition does not exist, wherein the controller includes a protective circuit for at least one of limiting current and protecting against a polarity reversal, and wherein the protective circuit includes a field effect transistor having a gate;
   a control unit to output a control voltage for the gate, wherein there is a smoothing capacitor for charge storage at the gate;
   providing a pulse-width modulated voltage at the gate of the field effect transistor; and
   selecting a duty factor of the pulse-width modulated voltage so that the voltage at the gate is held above a predetermined value.

7. The method of claim 6, wherein the duty factor is selected as a function of a capacitance of the smoothing capacitor and of a leakage current of the field effect transistor.

8. The method of claim 6, wherein the pulse-width modulated voltage is reduced if a fault condition is detected.

9. A non-transitory computer readable medium having a computer program, which is executable by a processor, comprising:
   a program code arrangement having program code for controlling a protective function in a controller, by performing the following:
      detecting that a fault condition does not exist, wherein the controller includes a protective circuit for at least one of limiting current and protecting against a polarity reversal, and wherein the protective circuit includes a field effect transistor having a gate;
      a control unit to output a control voltage for the gate, wherein there is a smoothing capacitor for charge storage at the gate;

providing a pulse-width modulated voltage at the gate of the field effect transistor; and selecting a duty factor of the pulse-width modulated voltage so that the voltage at the gate is held above a predetermined value.

\* \* \* \* \*